US011036328B2

(12) United States Patent
Setter et al.

(10) Patent No.: US 11,036,328 B2
(45) Date of Patent: Jun. 15, 2021

(54) TOUCH INPUT LOCK

(71) Applicant: Schlage Lock Company LLC, Carmel, IN (US)

(72) Inventors: Andrew Setter, Carmel, IN (US); Scott Baxter, Carmel, IN (US); Chris R. Snider, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/244,469

(22) Filed: Jan. 10, 2019

(65) Prior Publication Data

US 2020/0225798 A1  Jul. 16, 2020

(51) Int. Cl.
| | | |
|---|---|---|
| *G06F 3/041* | (2006.01) | |
| *G06F 3/0488* | (2013.01) | |
| *G06F 3/0354* | (2013.01) | |
| *G06F 3/01* | (2006.01) | |

(52) U.S. Cl.
CPC ............ *G06F 3/0416* (2013.01); *G06F 3/017* (2013.01); *G06F 3/03547* (2013.01); *G06F 3/04883* (2013.01)

(58) Field of Classification Search
CPC ............ G07C 9/00309; G07C 9/00658; G07C 9/00174; E05B 47/0001; E05B 47/00; E05B 47/0611; G06F 3/0483; G06F 21/30; G06F 3/0416; G06F 3/04883; G06F 3/03547; G06F 3/017; H04N 7/186; H04W 76/14; G07F 5/22
See application file for complete search history.

(56) References Cited

U.S. PATENT DOCUMENTS

| | | | |
|---|---|---|---|
| 9,336,637 B2 | 5/2016 | Neil et al. | |
| 9,524,601 B1 | 12/2016 | Dumas | |
| 9,552,475 B2 | 1/2017 | Sochman et al. | |
| 9,665,725 B2 | 5/2017 | Curtis | |
| 9,851,853 B2 | 12/2017 | O'Connor | |
| 9,856,109 B2 | 1/2018 | Schwarzentruber | |
| 9,965,911 B2 | 5/2018 | Wishne | |
| 10,007,777 B1 | 6/2018 | Saini | |
| 10,031,586 B2 | 7/2018 | Touloumtzis | |
| 2005/0179517 A1* | 8/2005 | Harms | G07F 5/22 340/5.9 |
| 2007/0150842 A1 | 6/2007 | Chaudhri et al. | |
| 2013/0237193 A1 | 9/2013 | Dumas et al. | |

(Continued)

FOREIGN PATENT DOCUMENTS

WO    2016085607 A1    6/2016

*Primary Examiner* — Richard J Hong
(74) *Attorney, Agent, or Firm* — Taft Stettinius & Hollister LLP

(57) ABSTRACT

An exemplary credential reader includes a touch-sensitive region and is configured to generate tap information and/or swipe information in response to the touch-sensitive region being tapped and/or swiped. In certain forms, the touch-sensitive region is a non-displaying track pad. In other forms, the touch-sensitive region is a touch-sensitive display. A lockset including the credential reader further includes a controller configured to generate credential information based upon information received from the credential reader. The controller may compare the credential information to an authorized credential and transmit a grant/deny signal based upon the comparing.

27 Claims, 6 Drawing Sheets

(56) References Cited

U.S. PATENT DOCUMENTS

| | | | |
|---|---|---|---|
| 2014/0040769 A1* | 2/2014 | Lazaridis | G06F 3/0483 |
| | | | 715/752 |
| 2014/0298672 A1 | 10/2014 | Straker et al. | |
| 2015/0279136 A1* | 10/2015 | Lovett | G07C 9/00174 |
| | | | 340/635 |
| 2015/0324557 A1* | 11/2015 | Kato | G06F 21/30 |
| | | | 726/16 |
| 2015/0358088 A1* | 12/2015 | Eim | H04W 76/14 |
| | | | 455/418 |
| 2016/0042581 A1* | 2/2016 | Ku | G07C 9/00309 |
| | | | 340/5.61 |
| 2016/0133071 A1* | 5/2016 | Henderson | E05B 47/0001 |
| | | | 70/277 |
| 2017/0204636 A1 | 7/2017 | Sack | |
| 2017/0284131 A1* | 10/2017 | Lin | E05B 47/00 |
| 2017/0332055 A1* | 11/2017 | Henderson | H04N 7/186 |
| 2018/0016836 A1 | 1/2018 | Ibsies | |
| 2018/0165901 A1 | 6/2018 | Lai | |
| 2018/0266145 A1* | 9/2018 | Chou | E05B 47/0001 |
| 2019/0152433 A1* | 5/2019 | Gumbo | G07C 9/00658 |
| 2019/0169874 A1* | 6/2019 | Gengler | E05B 47/0611 |
| 2019/0206165 A1* | 7/2019 | Chang | G07C 9/00309 |

* cited by examiner

TOUCH INPUT LOCK

TECHNICAL FIELD

The present disclosure generally relates to electronic locksets having touch inputs, and more particularly but not exclusively relates to such locksets in which the touch input is provided on a display region of the lockset.

BACKGROUND

Electronic locksets typically include some form of credential reading device on the outer side of the door such that a user can present a credential to cause the lockset to unlock. While certain credential readers require presentation of a physical token (e.g., a card or a fob), other credential readers are knowledge-based, and require that the user have knowledge of a particular passcode that the user inputs to the credential reader. Among the most popular formats for the latter type of credential reader is a keypad including alphanumeric buttons that the user depresses to input the passcode. While such keypads provide a favorable functionality, it has been found that many consumers disfavor the large and often bulky keypads from an aesthetic perspective. For these reasons among others, there remains a need for further improvements in this technological field.

SUMMARY

An exemplary credential reader includes a touch-sensitive region and is configured to generate tap information and/or swipe information in response to the touch-sensitive region being tapped and/or swiped. In certain forms, the touch-sensitive region is a non-displaying track pad. In other forms, the touch-sensitive region is a touch-sensitive display. A lockset including the credential reader further includes a controller configured to generate credential information based upon information received from the credential reader. The controller may compare the credential information to an authorized credential and transmit a grant/deny signal based upon the comparing. Further embodiments, forms, features, and aspects of the present application shall become apparent from the description and figures provided herewith.

DETAILED DESCRIPTION OF ILLUSTRATIVE EMBODIMENTS

Figure 1:
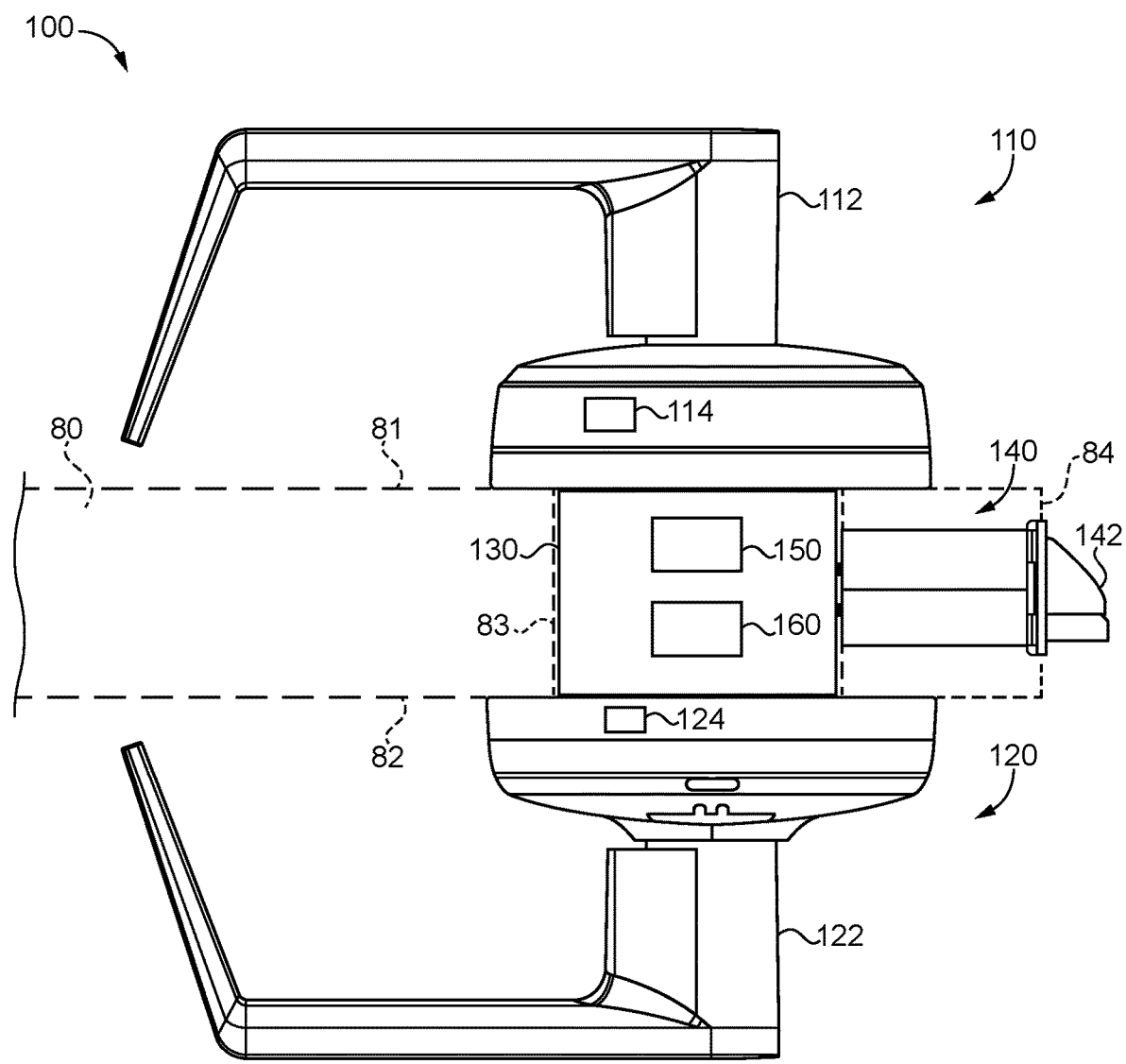
FIG. 1 is a plan view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is an access control device in the form of a lockset 100 according to certain embodiments. The lockset 100 is mounted to a door 80, and generally includes an inside assembly 110 mounted to an inner side 81 of the door 80, an outside assembly 120 mounted to an outer side 82 of the door 80, a chassis 130 mounted within a cutout 83 of the door 80 and connected with the inside assembly 110 and the outside assembly 120, and a bolt mechanism 140 operably connected with the chassis 130 and operable to extend beyond a swinging edge 84 of the door 80. The lockset 100 further includes an electronically-operable locking mechanism 150 having a locking state and an unlocking state, and a control assembly 160 operable to transition the locking mechanism 140 between the locking state and the unlocking state.

The inside assembly 110 includes an inside actuator 112 that is operably connected to the chassis 130 such that the inside actuator 112 is at least selectively operable to actuate the bolt mechanism 140. In the illustrated form, the inside actuator 112 is provided in the form of a handle, and more particularly as a lever. In other embodiments, the inside actuator 112 may be provided in another form, such as that of a knob, a thumbturn, or a pushbar mechanism. The inside assembly 110 further includes a lock state selector 114. In certain forms, the lock state selector 114 may be a mechanical lock state selector that physically drives the locking mechanism 150 between its locking state and its unlocking state. In other forms, the lock state selector 114 may be an electronic lock state selector that is in communication with the control assembly 160 and is operable to cause the control assembly 160 to transition the locking mechanism 150 between its locking state and its unlocking state.

The outside assembly 120 includes an outside actuator 122 that is operably connected to the chassis 130 such that the outside actuator 122 is selectively operable to actuate the bolt mechanism 140. In the illustrated form, the outside actuator 122 is provided in the form of a handle, and more particularly as a lever. In other embodiments, the outside actuator 122 may be provided in another form, such as that of a knob, a thumbturn, or a lock cylinder. The outside assembly 120 may further include a credential reader 124 in communication with the control assembly 160. Certain exemplary forms of the credential reader 124 are provided herein. During operation of the lockset 100, presentation of an appropriate credential to the credential reader 124 (e.g., by inputting a code and/or presenting a gesture) causes the control assembly 160 to transition the locking mechanism 150 from the locked state to the unlocked state to selectively permit actuation of the bolt mechanism 140 by the outside actuator 122.

The chassis 130 is mounted within the door cutout 83 and at least selectively connects each of the actuators 112, 122 with the bolt mechanism 140. The chassis 130 may, for example, take the form of a mortise-format chassis, a cylindrical-format chassis, or a tubular-format chassis, the features of which will be readily apparent to those skilled in the art. The chassis 130 has a locked state and an unlocked state. In the unlocked state, the chassis 130 maintains the bolt mechanism 140 in a retracted state and/or permits the outside assembly 120 to retract the bolt mechanism 140. In the locked state, the chassis 130 maintains the bolt mechanism 140 in an extended state and/or prevents the outside assembly 120 from retracting the bolt mechanism 140. The chassis 130 may be transitioned between the locked state and the unlocked state by the electronic locking mechanism 150.

The bolt mechanism 140 includes a bolt 142 having an extended position and a retracted position. With the bolt 142 in the extended position and the door 80 in the closed position, the bolt 142 extends into the doorframe and retains the door 80 in the closed position. When the bolt 142 is retracted, the door 80 is free to move to the open position. In the illustrated form, the bolt mechanism 140 is provided in the form of a latchbolt mechanism, and includes a spring-loaded latchbolt 142 that is biased toward its extended position. In other forms, the bolt mechanism 140 may be provided in the form of a deadbolt mechanism, and may include a bolt 142 in the form of a deadlocking deadbolt. Additionally, while the illustrated bolt mechanism 140 is provided adjacent the chassis 130, it is also contemplated that the bolt mechanism 140 may be positioned remotely from the chassis 130.

The electronic locking mechanism 150 may be mounted within the chassis 130, and has an unlocking state in which the door 80 can be opened from the outer side 82 (e.g., by operating the outside actuator 122 and/or pulling the door 80 toward its open position), and a locking state in which the door 80 cannot be opened from the outer side 82. In the illustrated form, the locking mechanism 150 prevents the outside actuator 122 from actuating the bolt mechanism 140 when in the locking state, and permits the outside actuator 122 to actuate the bolt mechanism 140 when in the unlocking state. In other forms, the locking mechanism 150 may retract the bolt 142 when transitioned from the locking state to the unlocking state, and may extend the bolt 142 when transitioned from the unlocking state to the unlocking state.

Figure 2:
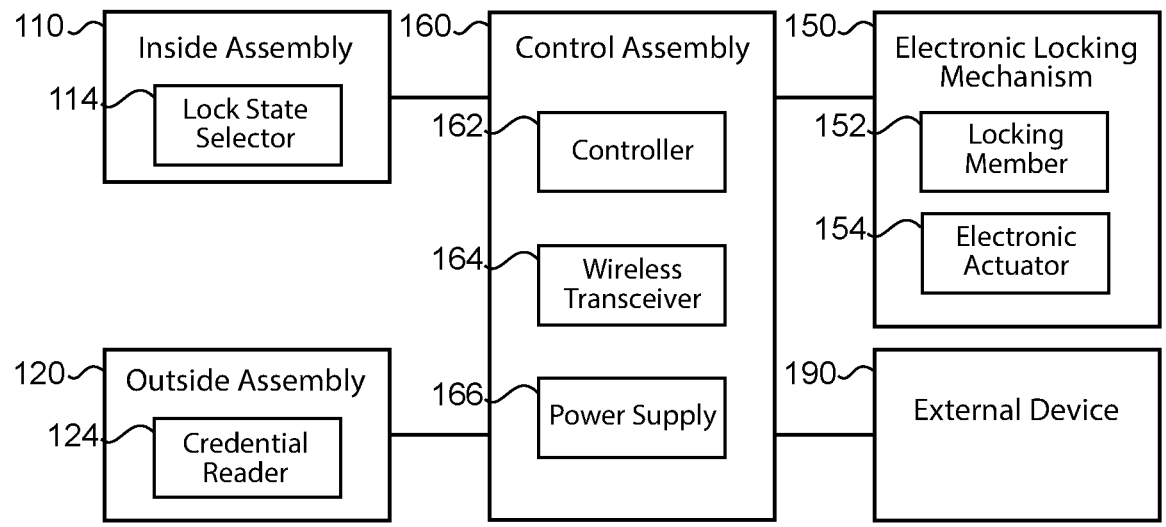
FIG. 2 is a schematic block diagram of a control assembly according to certain embodiments.

With additional reference to FIG. 2, the electronic locking mechanism 150 includes a locking member 152 having a locking position and an unlocking position, and an electronic actuator 154 operable to drive the locking member 152 between the locking position and the unlocking position to thereby adjust the locked/unlocked state of the lockset 100. In certain forms, the locking member 152 may be configured to selectively prevent the outside actuator 122 from retracting the bolt 142. As one example, the outside actuator 122 may be operably coupled with the bolt mechanism 140 such that rotation of the actuator 122 retracts the bolt 142, and the locking member 152 may prevent rotation of the actuator 122 when in the locking position. As another example, the outside actuator 122 may be selectively coupled with the bolt mechanism 140 via the locking member 152. In such forms, rotation of the actuator 122 may cause retraction of the bolt 142 when the locking member 152 is in its unlocking position, and the actuator 122 may freewheel without causing retraction of the bolt 142 when the locking member 152 is in its locking position. In further embodiments, the locking member 152 may be provided as the bolt 142 such that the locking mechanism 150 drives the bolt 142 between its extended locking position and its retracted unlocking position without requiring operation of either manual actuator 112, 122.

The control assembly 160 includes a controller 162, and may further include an onboard power supply 166 and/or a wireless transceiver 164 configured to facilitate communication between the controller 162 and an external device 190. The controller 162 is in communication with the credential reader 124 and the locking device 150, and is configured to control operation of the locking device 150 based in part upon information received from the credential reader 124. For example, when an appropriate credential is presented to the credential reader 124, the controller 162 may transmit an unlock signal that transitions the locking device 150 from the locking state to the unlocking state, thereby permitting opening of the door 80 from the outer side 82 thereof.

Figure 3:
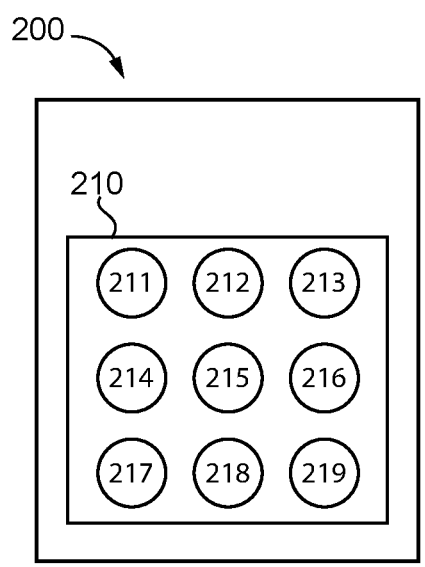
FIG. 3 is a schematic block diagram of a credential reader according to certain embodiments.

With additional reference to FIG. 3, illustrated therein is a credential reader 200 according to certain embodiments, which may be utilized as the credential reader 124 in the lockset 100. The credential reader 200 includes a touch-sensitive track pad 210 configured to generate coordinate information relating to the location at which it has been touched by a user's finger. The track pad 210 may, for example, be provided in the form of a capacitive touch pad. The track pad 210 may have a plurality of zones 211-219 defined thereon. While the illustrated track pad 210 defines nine discrete zones 211-219, it is to be appreciated that more or fewer zones may be utilized, and that some or all of the zones may define continuous regions with adjacent zones. In certain forms, the track pad 210 may include landmarks denoting notable features (e.g., the center and/or boundaries) of one or more zones. In certain forms, the track pad 210 may be a non-displaying track pad. In other embodiments, the track pad 210 may include features by which the track pad 210 can selectively display information, such as an LED array.

Figure 4:
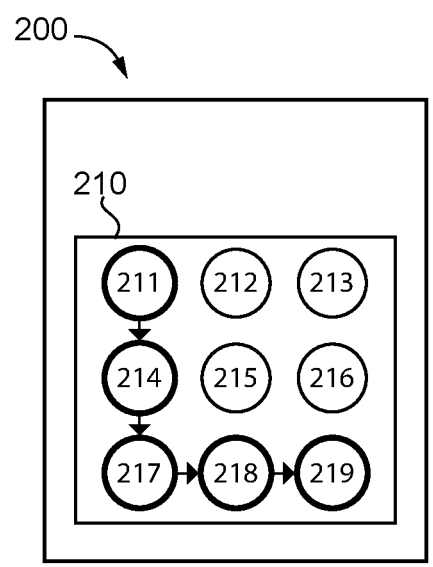
FIG. 4 is a schematic block diagram of the credential reader illustrated in FIG. 3 while being swiped.

The track pad 210 is sensitive to the touch of a human finger, and is configured to generate information relating to the location in which it is being touched. In the illustrated form, the track pad 210 is configured to generate information relating to the zone being touched. For example, the track pad 210 may generate coordinate information relating to the X- and Y-coordinates of the contact, and the controller 162 may compare the coordinate information to known boundaries of the zones 211-219 to determine the zone within which the touch is located. For example, in the event that the user traces an L-shaped gesture along the track pad (FIG. 4), the controller 162 may determine that zones have been touched in the sequence of 211, 214, 217, 218, 219, thereby generating credential information relating to such a sequence.

In certain forms, the controller 162 may utilize the coordinate information from the track pad 210 to generate credential information that is independent of the location of the track pad on which the gesture is made. To take a simple example, the controller 162 may interpret the sequence 211, 212, 213 as a gesture of a horizontal line extending from left to right, and generate the credential information as corresponding to such a gesture. When a horizontal line is traced from left to right along another portion of the track pad (e.g., in the sequence 214, 215, 216), the controller 162 may interpret such coordinate information as corresponding to the same gesture as the sequence of 211, 212, 213. Thus, in certain forms, the controller 162 may be agnostic as to the gesture's location on the track pad 210. By taking more zones into account, significantly more complex gestures may be possible, and the controller 162 may utilize known pattern recognition techniques to distinguish between such gestures.

In certain forms, the controller 162 may be configured to distinguish between gestures and discrete touches using the coordinate information received from the credential reader 200. The controller 162 may thus generate the credential information to include both gesture information and zone information. In certain forms, the gesture information may be location-agnostic while the zone information is location-dependent. For example, an authorized credential may include a left-to-right swipe on any location of the track pad 210 followed by touching the zones 215, 211, 213 in sequence. As noted above, the track pad 210 may include landmarks indicating features of the zones, which may facilitate the user's touching of the track pad 210 in the appropriate zones.

As should be evident from the foregoing description, the credential reader 200 provides an alternative to traditional knowledge-based credential readers such as keypads. More particularly, the credential reader 200 facilitates the creation of knowledge-based credentials that include both gestures and sequences. In contrast, traditional keypad-type credential readers allow only for sequence-based credentials, such as PIN codes. In providing gestures as an additional option, the credential reader 200 may increase the number of possible credentials while maintaining the touch-based input to which users have become accustomed.

Figure 5:
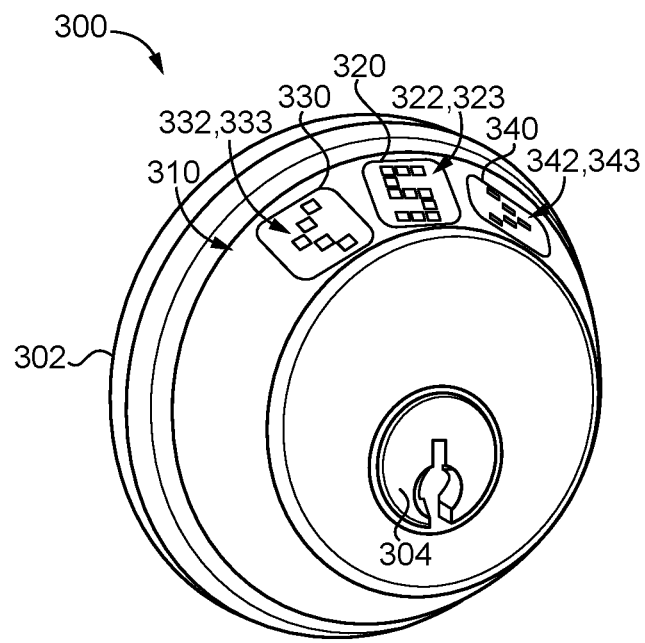
FIG. 5 is a perspective illustration of a portion of a lockset according to certain embodiments.

With additional reference to FIG. 5, illustrated therein is at least a portion of an outside assembly 300, which may be included in or constitute the outside assembly 120 of the lockset 100. The outside assembly 300 includes a generally circular housing in the form of a shroud 302, a lock cylinder 304 mounted in the shroud 302, and a credential reader 310 according to certain embodiments.

Figure 6:
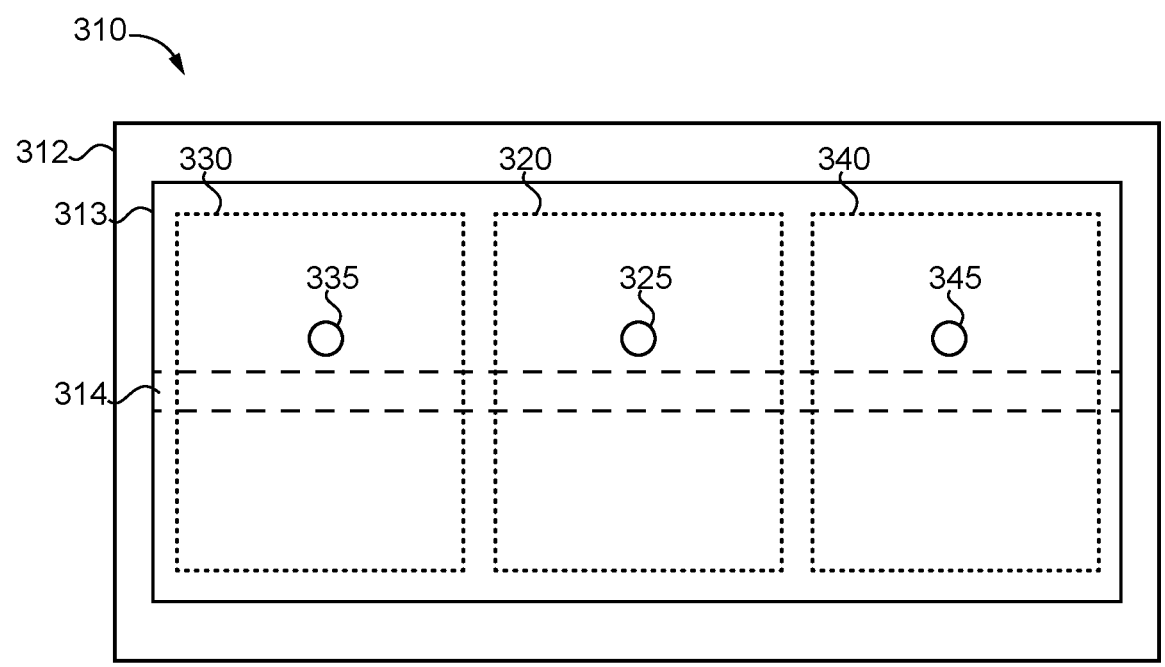
FIG. 6 is a schematic block diagram of a credential reader according to certain embodiments.

With additional reference to FIG. 6, the credential reader 310 includes a touch-sensitive display 312 having a plurality of touch sensitive display regions, including a first touch-sensitive display region configured to display a code character 322. The touch-sensitive display 312 may include at least one additional touch-sensitive display region. In the illustrated form, the touch-sensitive display 312 includes three touch-sensitive display regions 320, 330, 340. In certain embodiments, the display regions 320, 330, 340 may be contiguous, while in other embodiments the display regions 320, 330, 340 may be discrete.

The touch-sensitive display 312 may, for example, include a dot matrix light emitting diode (LED) display 313. As described herein, such a dot matrix style display has the advantage of facilitating the display of various feedback messages and icons. In certain embodiments, the touch-sensitive display 312 may include separate switches 325, 335, 345 (e.g., resistive, tactile or capacitive switches) for each touch-sensitive display region 320, 330, 340. In certain embodiments, the touch-sensitive display 312 may include a capacitive sense array 314 operable to distinguish between swipes in a first direction (e.g., left-to-right), swipes in a second direction (e.g., right-to-left), and taps or discrete touches on the various display regions 320, 330, 340.

Each of the display regions is operable to selectively display indicia that facilitate entry of a code to the credential reader 310. In the illustrated form, the first display region 320 is located between the second display region 330 and the third display region 340, and is configured to display a code character 322 such as a code number 323. The second display region 330 is positioned to the left of the first display region 320 and displays an indicium 332 indicating that touching the first display region 320 adjusts the displayed code character 322 in a first manner. For example, the indicium 332 may comprise a down arrow or a left arrow 333 indicating that touching the second display region 330 decrements the displayed code number 323. The third display region 340 is positioned to the right of the first display region 320 and displays an indicium indicating that touching the third display region 340 adjusts the code character 322 in a second manner opposite the first manner. For example, the indicium 342 may comprise an up arrow or a right arrow 343 indicating that touching the third display region 340 increments the displayed code number 323.

While the code character 322 of the illustrated embodiment is provided in the form of a code number 323, it is also contemplated that the code character 322 may take another form, such as that of a letter or a non-alphanumeric symbol. Thus, while certain descriptions herein may make reference to incrementing, decrementing, and selecting the displayed code number 323, those skilled in the art will readily appreciate that similar actions may be performed using code characters 322 of another form (e.g., letters and/or symbols).

During normal operation, the credential reader 310 may begin in a sleep mode in which the display 312 is turned off to save battery power. The credential reader 310 may awaken in response to a waking touch, which may, for example, be provided at one or another of the touch-sensitive display regions 320, 330, 340. Upon waking, the credential reader 310 is configured to display the displayed code character 322 at the first touch-sensitive display region 320, and to select the displayed code character 322 in response to being touched in a first touching manner. For example, the credential reader 310 may select the displayed code character 322 in response to the first touch-sensitive display region 320 being tapped. Upon selecting the displayed code character 322, the credential reader transmits to the controller 162 code character information relating to the selected code character. As described herein, the credential reader 310 may further cause additional indicia to be displayed on the touch-sensitive display 312 to confirm selection of the code character 322.

The credential reader 310 is also configured to adjust the displayed code character 322 in a first adjusting manner when the touch-sensitive display 312 is touched in a second touching manner different from the first touching manner. As one example, the credential reader 310 may increment the displayed code number 313 when the second touch-sensitive display region 330 is tapped. As another example, the credential reader 310 may increment the displayed code number 313 when the capacitive sense region 314 indicates a swipe in the first swipe direction (e.g., the left-to-right direction).

The credential reader 310 may further be configured to adjust the displayed code character 322 in a second adjusting manner opposite the first adjusting manner when the touch-sensitive display 312 is touched in a third touching manner different from the first and second touching manners. As one example, the credential reader 310 may decrement the displayed code number 313 when the third touch-sensitive display region 340 is tapped. As another example, the credential reader 310 may decrement the displayed code number 313 when the capacitive sense region 314 indicates a swipe in the second swipe direction (e.g., the right-to-left direction).

The credential reader 310 is in communication with the controller 162, and is configured to transmit to the controller 162 code character information relating to the displayed code character 322 in response to the displayed code character 322 being selected. The credential reader 310 may further cause the touch-sensitive display 312 to display indicia indicating to the user that the displayed code character 322 has been successfully selected. For example, the credential reader 310 may cause the second and third display regions 330, 340 to display check marks.

The controller 162 is configured to generate credential information based upon the code character information received from the credential reader 310. For example, when the code number "9" is selected at the credential reader 310, the controller 162 adds "9" to the credential information, thereby generating or modifying a credential code. Upon selecting the displayed code character 322, the credential reader 310 may display indicia indicating that the displayed code character 322 has successfully been selected, and in certain forms may cause the displayed code character 322 to revert to a default code character. For example, where code numerals are used, the displayed code numeral 323 may revert to the "5" number, thereby facilitating selection of the next code numeral 323.

Once a sufficient number of code characters 322 have been added to the credential information (e.g., four code characters 322), the controller 162 may compare the generated credential information to authorized credential information. If the credential information matches the authorized credential, the controller 162 transmits the unlock signal to the locking mechanism 150, thereby unlocking the lockset 100. The credential reader 310 may cause the touch-sensitive display 312 to display unlocking indicia indicating that the lockset 100 has successfully been unlocked. If the credential information does not match the authorized credential, the controller 162 does not transmit the unlock signal to the locking mechanism 150, and the lockset 100 remains locked. The credential reader 310 may cause the touch-sensitive display 312 to display failure indicia indicating that the lockset 100 has not been unlocked.

As noted above, the lockset 100 may include a wireless transceiver 164 to facilitate communication between the controller 162 and an external device 190, such as a mobile device. In certain embodiments, the external device 190 may be utilized to commission and/or configure the credential reader 310, and the credential reader 310 may be configured to display indicia relating to such commissioning and/or configuring. In certain embodiments, at least some of the below-described steps of commissioning and configuring may be performed at the credential reader 310 without requiring connection to the external device 190.

Figure 7:
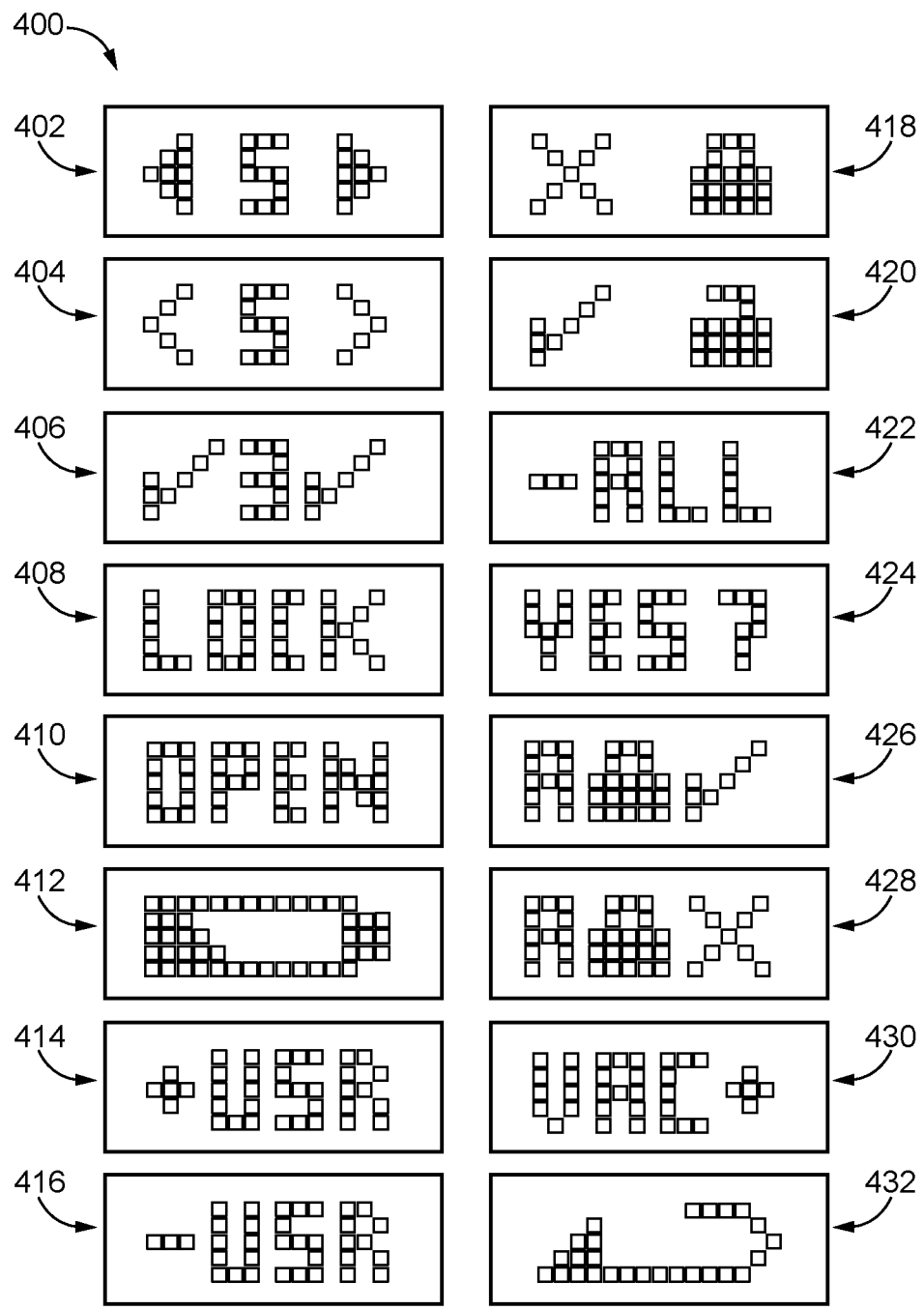
FIG. 7 illustrates various indicia that may be displayed on the credential reader illustrated in FIG. 6.

With additional reference to FIG. 7, illustrated therein are examples of indicia 400 that may be displayed on the touch-sensitive display 312 during operation of the lockset 100. As will be appreciated, at least some of the indicia 400 may be displayed on the touch-sensitive display 312 during normal operation of the lockset 100, and at least some of the indicia 400 may be displayed on the touch-sensitive display during commissioning and/or configuring of the lockset 100.

Indicia 402 and indicia 404 each relate to the adjustment of the code character 322, and include the above-described code character 322 and selection arrows. Indicia 402/404 may, for example, be displayed to facilitate adjustment and selection of the code character 322.

Indicia 406 relates to selection of the code character, and include the displayed code character 322 and check marks. Indicia 406 may, for example, be displayed to indicate that the displayed code character 322 has successfully been selected and added to the credential code information.

Indicia 408 relates to the locked state and may, for example, be displayed to indicate that the lockset 100 has returned to its locking state following a successful unlocking operation.

Indicia 410 relates to the unlocked state and may, for example, be displayed to indicate that the lockset 100 has successfully been unlocked and that the door can be opened.

Indicia 412 relates to a low-battery state and may, for example, be displayed when the controller 162 detects that the onboard power supply 166 is running low.

Indicia 414 relates to adding a user to a list of authorized users. The indicia 414 may, for example, be displayed during a commissioning operation in which a new user credential is being added to the list of authorized credentials.

Indicia 416 relates to removing a user from the list of authorized users. The indicia 414 may, for example, be displayed during a commissioning operation in which a user credential is being removed from the list of authorized credentials.

Indicia 418 relates to a failure to transition to the unlocked state, and indicates that the lockset 100 remains locked. The indicia 418 may, for example, be displayed in response to the inputted credential failing to match an authorized credential in the list of authorized credentials.

Indicia 420 relates to a successful transition to the unlocked state and may, for example, be displayed when the lockset 100 has successfully been unlocked by operation of the credential reader 310.

Indicia 422 relates to a commissioning operation in which all user codes are to be removed from the list of authorized credentials, and may be displayed during such an operation.

Indicia 424 are confirmation indicia and may, for example, be displayed when confirmation of an action is sought. By way of example, the confirmation indicia 424 may be displayed after displaying indicia 422 to confirm that the user truly desires to erase all stored codes, thereby hindering accidental erasure.

Indicia 426 and 428 relate to automatic locking. In certain embodiments, the lockset 100 may be operable to automatically return to the locked state a predetermined amount of time after being unlocked by the credential reader 310. In such forms, the credential reader 310 may selectively display indicia 426 to indicate that such automatic relocking is enabled, and may selectively display indicia 428 to indicate that such automatic relocking is disabled.

Indicia 430 relates to a vacation mode, and may be selectively displayed to indicate that the lockset 100 is operating in such a vacation mode. While operating in vacation mode, operation of the lock by the credential reader 310 may be disabled such that the user must use a physical key to operate the lockset 100 from the outer side of the door.

Indicia 432 includes return indicia, and may be displayed when tapping the touch-sensitive display 312 will cause the credential reader 310 to return to a higher-level menu or abort the commissioning and/or configuring process.

Those skilled in the art will readily recognize that the illustrated indicia 400 among others may be displayed during normal operation of the lockset 100 and/or during the commissioning and/or configuring of the lockset 100. To take one example, upon entry of a configure-authorized code, the credential reader 310 may enter a configure operation. The configure operation may begin by displaying the add user indicia 414, and touching the display 312 in the first manner (e.g. by tapping the first region 320) may cause the credential reader 310 to enter a user-adding process in which a new code is added to the list of authorized codes. In response to the display 312 being touched in the third touching manner (e.g., by tapping the region 330 or swiping to the left), the credential reader 310 may display the return indicia 432. Conversely, touching the display 312 in the second manner (e.g., by tapping the region 340 or swiping to the right) may cause the credential reader 310 to display the remove user indicia 416.

While the remove user indicia 416 is displayed, touching the display 312 in the first manner may cause the credential reader 310 to enter a user-removing process in which an existing code is removed from the list of authorized codes. In response to the display 312 being touched in the third touching manner, the credential reader 310 may again display the add user indicia 414. In response to the display 312 being touched in the second touching manner, the credential reader 310 may cause the remove all users indicia 422 to be displayed.

While the remove all users indicia 422 is displayed, touching the display 312 in the first manner may cause the credential reader 310 to display the confirmation indicia 424. Again touching the display 312 in the first manner may cause the credential reader 310 to remove all unlock-authorized codes. Touching the display 312 in the second manner and/or the third manner may cause the credential reader 310 to once again display the remove all users indicia 422. At this stage, touching the display 312 in the third manner may cause the credential reader 310 to display the remove single user indicia 416.

With the remove all users indicia 422 displayed, touching the display in the second manner may cause the credential reader 310 to display the appropriate one of the automatic locking indicia 426, 428. From this stage, touching the display 312 in the first manner may cause the controller 162 to transition the lockset 100 between an automatic locking state and a non-automatic locking state, thereby causing the other indicia 426, 428 to be displayed. Touching the display 312 in the third manner may cause the credential reader 310 to display the remove all users indicia 422, and touching the display 312 in the second manner may cause the credential reader 310 to display the vacation mode indicia 430.

With the vacation mode indicia 430 displayed, touching the display 312 in the first manner may cause the lockset 100 to transition between a vacation mode and a standard operating mode. Touching the display 312 in the third manner may cause the credential reader 310 to display the appropriate one of the automatic locking indicia 426, 428, and touching the display 312 in the second manner may cause the credential reader 310 to display the return indicia 432.

Although an example order in which the indicia 400 may be displayed has been described, it is to be appreciated that other orderings are also contemplated. It should also be appreciated that one or more of the above-described indicia 400 may not necessarily be displayed, and that additional or alternative indicia not specifically illustrated in FIG. 7 may be displayed. For example, in embodiments in which the lockset 100 does not have a vacation mode, the vacation mode indicia 430 may not necessarily be displayed. As another example, although not specifically illustrated in FIG. 7, the indicia 400 may include indicia indicating the strength of a wireless communication connection established by the wireless transceiver 164. It should also be appreciated that while the confirmation indicia 424 has been described only in association with the remove all users operation, the confirmation indicia 424 may be utilized in association with other operations.

As should be evident from the foregoing, the dot matrix LED array 313 utilized in the illustrated embodiment provides appreciable flexibility in facilitating the operation of the credential reader 310, both in the normal mode and the commission/configure mode. The LED array 313 also provides the advantage of being self-illuminated, thereby obviating the need for additional illumination devices when the credential reader 310 is operated in dark environments. In certain forms, the LED array 313 may be a printed-on-film LED array, which may provide for exceptionally thin forms of the touch-sensitive display 312. It has been found that such embodiments may integrate the switches, the illuminating areas, and the circuitry within a thickness of less than twenty thousandths of one inch. Such a thin display 312 allows the trim cover to sandwich the display 312 between the deadbolt shroud 302 and the cover, leaving open areas for the user to see and touch the switches. In other forms, standard discrete components of a seven segment display and illuminated tact switches could be wired together to achieve the same functionality, but the thickness may be greater.

Due to the small footprint of the touch-sensitive display 312, the credential reader 310 is able to be incorporated in deadbolt assemblies having standard dimensions. For example, the credential reader 310 may fit within the decorative trim cover of the shroud 302, which provides a very discreet aesthetic to minimize the visible portion of the code entry user interface. This approach may also save manufacturing costs since it does not require a separate escutcheon to contain a keypad. It also provides flexibility for the aesthetic style of the lockset 100, as the user need only select the aesthetic of the trim cover. Due to the low profile of the credential reader 310, it does not detract from the overall aesthetic of the lock in the manner that traditional keypads have been known to do.

One additional drawback of conventional keypad mechanisms is that with heavy use, fingerprint residue or wearing of the most-used keys may give unauthorized persons clues as to which numbers are included in the unlock code, thereby decreasing security. In contrast, the credential reader 310 displays all code characters at one location, which eliminates the above-noted drawback of conventional keypads.

Figure 8:
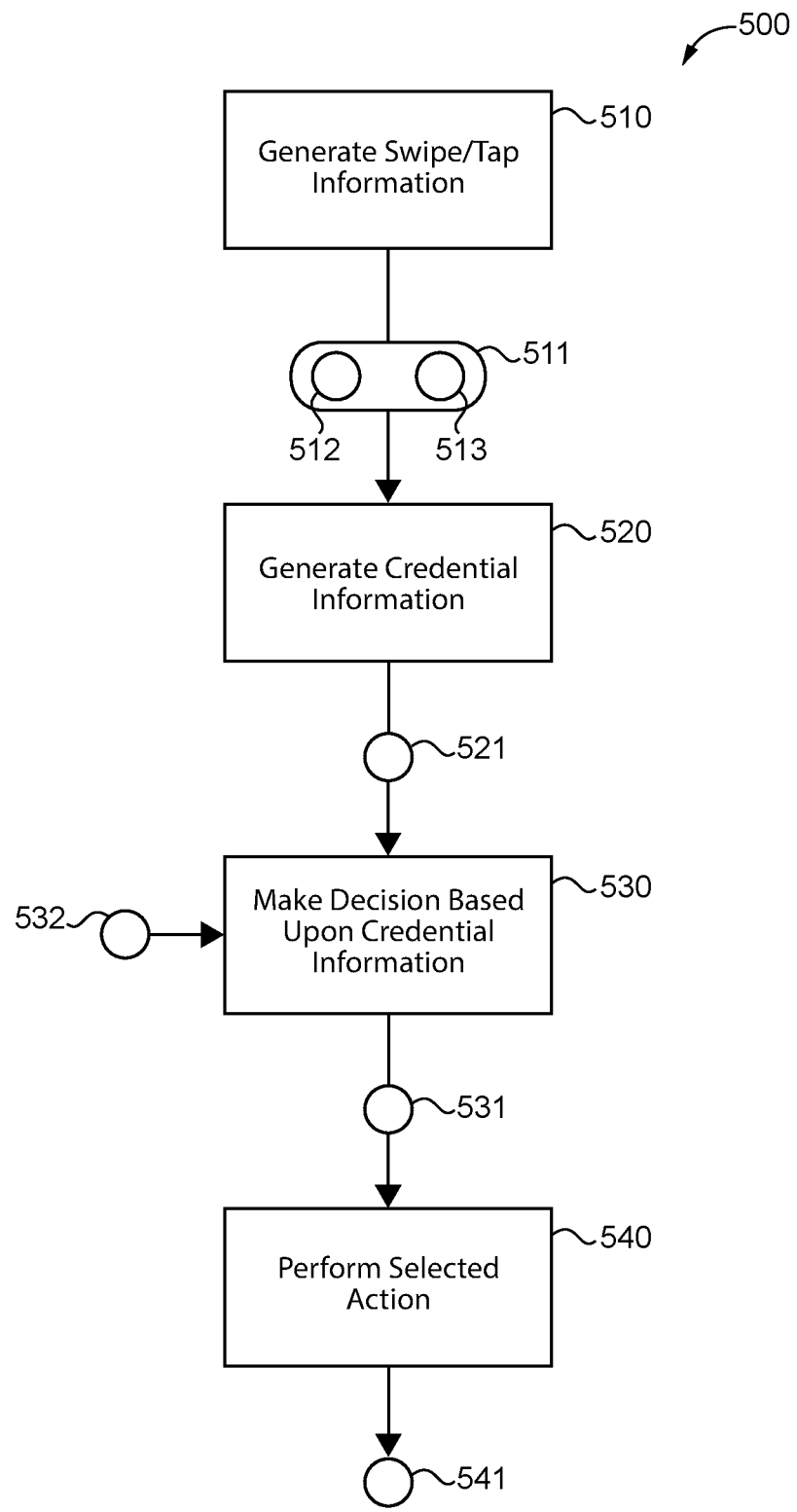
FIG. 8 is a schematic flow diagram of a process according to certain embodiments.

With additional reference to FIG. 8, an exemplary process 500 that may be performed using the lockset 100 and one or both of the credential readers 200, 310 is illustrated. Operations illustrated for the processes in the present application are understood to be examples only, and operations may be combined or divided, and added or removed, as well as re-ordered in whole or in part, unless explicitly stated to the contrary. Unless specified to the contrary, it is contemplated that certain operations or steps performed in the process 400 may be performed wholly by the credential reader 124 (e.g., the credential reader 200 and/or the credential reader 310), the locking mechanism 150, the control assembly 160, and/or the external device 190, or that the operations or steps may be distributed among one or more of the elements and/or additional devices or systems that are not specifically illustrated in FIGS. 1-7.

The process 500 includes block 510, which generally involves generating swipe/tap information 511 using the credential reader 124. For example, block 510 may involve generating the swipe/tap information 511 based upon swipes and/or taps on the track pad 210 and/or the touch-sensitive display region 312. Block 510 may further include waking the credential reader 124 and/or the controller 162 in response to the initial tap/swipe, for example in embodiments in which the credential reader 124 and/or the controller 162 is operable in a low-power sleep mode. As noted above, at least some embodiments of the above-described track pad 210 and touch-sensitive display 312 are operable to distinguish between touches and swipes. Thus, in at least some embodiments, the swipe/tap information 511 may include both swipe information 512 and tap information 513, wherein the controller 162 is capable of distinguishing between the touches and the swipes.

The process 500 also includes block 520, which generally involves generating credential information 521 based upon the swipe/tap information 511. For example, in embodiments in which the credential reader 124 is provided in the form of the credential reader 200, the credential information 521 may include information representative of the swipes and the taps, one or both of which may be location-agnostic or location-dependent. In embodiments in which the credential reader 124 is provided in the form of the credential reader 310, the controller 162 may alter the displayed code character 322 in response to swipes and/or taps of one type (e.g., taps on the second and third display regions 230, 240), and generate the credential information 521 to include the displayed code character 322 in response to taps of a second type (e.g., taps on the first display region 220).

The process 500 further includes block 530, which generally involves transmitting a signal 531 based upon the credential information 521. For example, block 530 may involve comparing the credential information 521 to an authorized credential 532, and transmitting a grant/deny signal 531 based upon the comparing. In such forms, block 530 may involve transmitting the grant/deny signal 531 as a grant signal when the credential information 521 corresponds to an authorized credential 532, and transmitting the grant/deny signal 531 as a deny signal when the credential information 521 does not correspond to an authorized credential 532.

The process further includes block 540, which generally involves performing an action 541 based upon the signal 531. For example, in embodiments in which the signal 531 is provided as a grant/deny signal, block 540 may involve operating the locking mechanism 150 to unlock the lockset 100 in response to the grant signal, and may involve not operating the locking mechanism 150 such that the lockset 100 remains locked in response to the deny signal. Block 540 may further include performing additional or alternative actions in response to the grant/deny signal 531. For example, in embodiments in which the credential reader 124 is provided as the credential reader, block 540 may involve displaying the grant indicia 420 in response to the grant signal, and displaying the deny indicia 418 in response to the deny signal.

Figure 9:
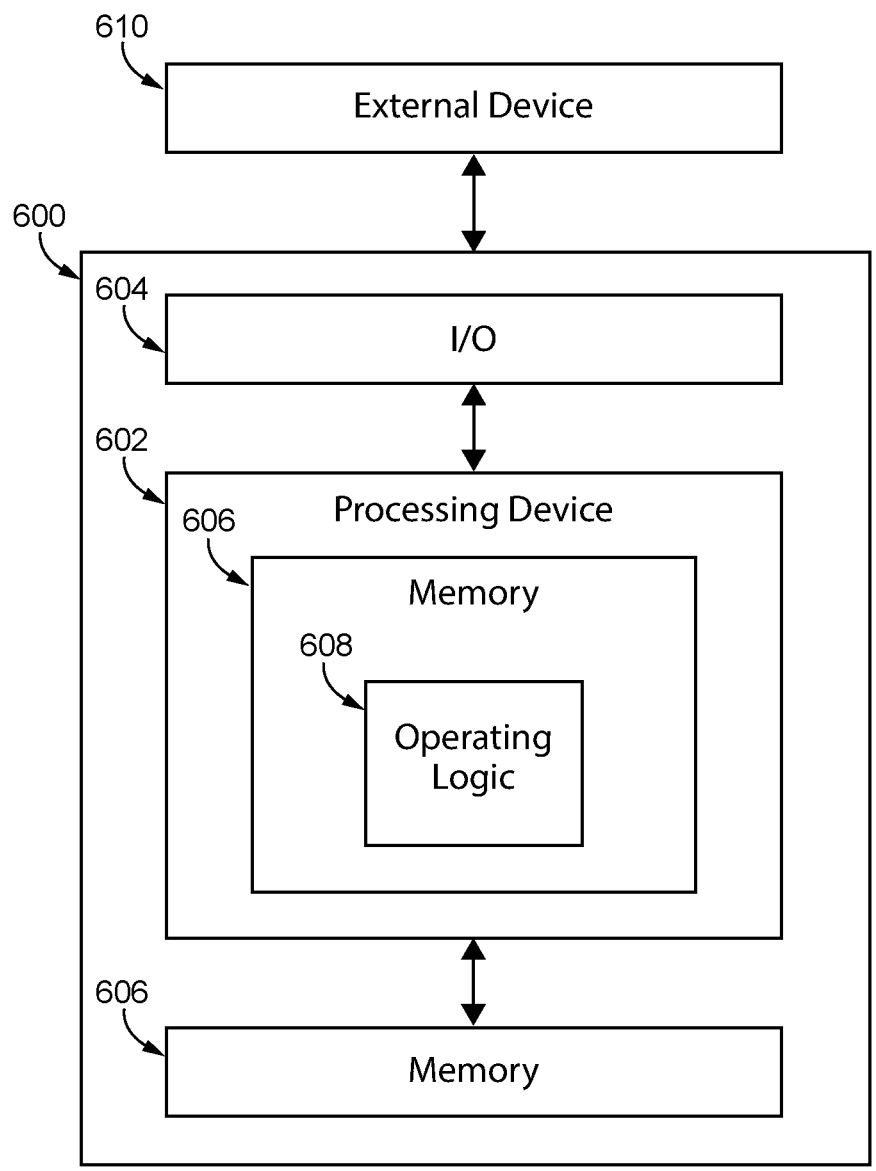
FIG. 9 is a schematic block diagram of a computing device.

Referring now to FIG. 9, a simplified block diagram of at least one embodiment of a computing device 600 is shown. The illustrative computing device 600 depicts at least one embodiment of a lockset, credential reader, control assembly, controller, locking device, or external device that may be utilized in connection with the lockset 100, credential readers 124, 200, 310, control assembly 160, controller 162, locking device 150, or external device 190 shown in FIGS. 1-7.

Depending on the particular embodiment, computing device 600 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 600 includes a processing device 602 that executes algorithms and/or processes data in accordance with operating logic 608, an input/output device 604 that enables communication between the computing device 600 and one or more external devices 610, and memory 606 which stores, for example, data received from the external device 610 via the input/output device 604.

The input/output device 604 allows the computing device 600 to communicate with the external device 610. For example, the input/output device 604 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 600. The input/output device 604 may include hardware, software, and/or firmware suitable for performing the techniques described herein.

The external device 610 may be any type of device that allows data to be inputted or outputted from the computing device 600. For example, in various embodiments, the external device 610 may be embodied as one of the credential readers 124, 200, 310 or the external device 190, such as a mobile device. Further, in some embodiments, the external device 610 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 610 may be integrated into the computing device 600.

The processing device 602 may be embodied as any type of processor(s) capable of performing the functions described herein. In particular, the processing device 602 may be embodied as one or more single or multi-core processors, microcontrollers, or other processor or processing/controlling circuits. For example, in some embodiments, the processing device 602 may include or be embodied as an arithmetic logic unit (ALU), central processing unit (CPU), digital signal processor (DSP), and/or another suitable processor(s). The processing device 602 may be a programmable type, a dedicated hardwired state machine, or a combination thereof. Processing devices 602 with multiple processing units may utilize distributed, pipelined, and/or parallel processing in various embodiments. Further, the processing device 602 may be dedicated to performance of just the operations described herein, or may be utilized in one or more additional applications. In the illustrative embodiment, the processing device 602 is of a programmable variety that executes algorithms and/or processes data in accordance with operating logic 608 as defined by programming instructions (such as software or firmware) stored in memory 606. Additionally or alternatively, the operating logic 608 for processing device 602 may be at least partially defined by hardwired logic or other hardware. Further, the processing device 602 may include one or more components of any type suitable to process the signals received from input/output device 604 or from other components or devices and to provide desired output signals. Such components may include digital circuitry, analog circuitry, or a combination thereof.

The memory 606 may be of one or more types of non-transitory computer-readable media, such as a solid-state memory, electromagnetic memory, optical memory, or a combination thereof. Furthermore, the memory 606 may be volatile and/or nonvolatile and, in some embodiments, some or all of the memory 606 may be of a portable variety, such as a disk, tape, memory stick, cartridge, and/or other suitable portable memory. In operation, the memory 606 may store various data and software used during operation of the computing device 600 such as operating systems, applications, programs, libraries, and drivers. It should be appreciated that the memory 606 may store data that is manipulated by the operating logic 608 of processing device 602, such as, for example, data representative of signals received from and/or sent to the input/output device 604 in addition to or in lieu of storing programming instructions defining operating logic 608. As illustrated, the memory 606 may be included with the processing device 602 and/or coupled to the processing device 602 depending on the particular embodiment. For example, in some embodiments, the processing device 602, the memory 606, and/or other components of the computing device 600 may form a portion of a system-on-a-chip (SoC) and be incorporated on a single integrated circuit chip.

In some embodiments, various components of the computing device 600 (e.g., the processing device 602 and the memory 606) may be communicatively coupled via an input/output subsystem, which may be embodied as circuitry and/or components to facilitate input/output operations with the processing device 602, the memory 606, and other components of the computing device 600. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 600 may include other or additional components, such as those commonly found in a typical computing device (e.g., various input/output devices and/or other components), in other embodiments. It should be further appreciated that one or more of the components of the computing device 600 described herein may be distributed across multiple computing devices. In other words, the techniques described herein may be employed by a computing system that includes one or more computing devices. Additionally, although only a single processing device 602, I/O device 604, and memory 606 are illustratively shown in FIG. 6, it should be appreciated that a particular computing device 600 may include multiple processing devices 602, I/O devices 604, and/or memories 606 in other embodiments. Further, in some embodiments, more than one external device 610 may be in communication with the computing device 600.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:
1. A lockset, comprising:
a locking member movable between a locking position and an unlocking position to adjust the lockset between a locked state and an unlocked state;
an electronic actuator configured to move the locking member from the locking position to the unlocking position in response to receiving an unlock signal;
an outside assembly configured for mounting to an outer side of a door, wherein the outside assembly includes a credential reader comprising a first touch-sensitive display and a first touch-sensitive adjustment region; and
a controller in communication with the credential reader and the electronic actuator, wherein the controller is configured to:
cause the first touch-sensitive display to display a displayed code character;

alter the displayed code character in response to the first touch-sensitive adjustment region being touched;
generate credential information related to the displayed code character in response to the first touch-sensitive display being touched;
compare the credential information to an authorized credential; and
transmit the unlock signal to the electronic actuator in response to the credential information matching the authorized credential; and
wherein the first touch-sensitive display and the first touch-sensitive adjustment region are separate and distinct components.

2. The lockset of claim 1, wherein the displayed code character is selected from a set of available code characters including a plurality of alphanumeric characters;
wherein the controller is configured to adjust the displayed code character within the set of available code characters in response to the touch-sensitive region being touched in the first touching manner; and
wherein the controller is configured to include the displayed code character in the credential information in response to the touch-sensitive region being touched in the second touching manner.

3. The lockset of claim 1, further comprising a second touch-sensitive display defining the touch-sensitive adjustment region; and
wherein the controller is further configured to cause the second touch-sensitive display to display a first arrow.

4. The lockset of claim 1, wherein the displayed code character is the only code character displayed by the first touch-sensitive display.

5. The lockset of claim 1, wherein the credential reader further comprises a second touch-sensitive adjustment region;
wherein the displayed code character is an alphanumeric code character;
wherein the controller is configured to increment the alphanumeric code character in response to touching of the first touch-sensitive adjustment region; and
wherein the controller is configured to decrement the alphanumeric code character in response to touching of the second touch-sensitive adjustment region.

6. The lockset of claim 5, wherein the first touch-sensitive adjustment region and the second touch-sensitive adjustment region are separate and distinct components.

7. The lockset of claim 5, further comprising:
a second touch-sensitive display defining the first touch-sensitive adjustment region; and
a third touch-sensitive display defining the second touch-sensitive adjustment region.

8. The lockset of claim 7, wherein the controller is further configured to cause the second touch-sensitive display region to display a first indicium pointing in a first direction; and
wherein the controller is further configured to cause the third touch-sensitive display region to display a second indicium pointing in a second direction opposite the first direction.

9. A lockset, comprising:
a locking member movable between a locking position and an unlocking position to adjust the lockset between a locked state and an unlocked state;
an electronic actuator configured to move the locking member from the locking position to the unlocking position in response to receiving an unlock signal;
an outside assembly configured for mounting to an outer side of a door, wherein the outside assembly includes a credential reader comprising a touch-sensitive display operable to display a displayed code character, wherein the displayed code character is an alphanumeric character, wherein the credential reader is configured to adjust the displayed code character in a first adjusting manner in response to the touch-sensitive display being touched in a first touching manner, and to transmit code character information relating to the code character in response to the touch-sensitive display being touched in a second touching manner; and
a controller in communication with the credential reader and the electronic actuator, wherein the controller is configured to:
generate credential information based upon code character information received from the credential reader;
compare the credential information to an authorized credential; and
transmit the unlock signal to the electronic actuator in response to the credential information matching the authorized credential;
wherein the touch-sensitive display comprises a first touch-sensitive display region operable to display the displayed code character; and
wherein the credential reader is configured to transmit the code character information in response to the first touch-sensitive display region being touched.

10. The lockset of claim 9, wherein the touch-sensitive display further comprises a second touch-sensitive display region operable to display a first indicium relating to the first adjusting manner; and
wherein the credential reader is configured to adjust the displayed code character in the first adjusting manner in response to the second touch-sensitive display region being touched.

11. The lockset of claim 9, wherein the credential reader is further configured to adjust the displayed code character in a second adjusting manner opposite the first adjusting manner in response to the touch-sensitive display being touched in a third touching manner.

12. The lockset of claim 11, wherein the touch-sensitive display further comprises:
a second touch-sensitive display region operable to display a first indicium relating to the first adjusting manner, wherein the credential reader is configured to adjust the displayed code character in the first adjusting manner in response to the second touch-sensitive display region being touched; and
a third touch-sensitive display region operable to display a second indicium relating to the second adjusting manner, wherein the credential reader is configured to adjust the displayed code character in the second adjusting manner in response to the third touch-sensitive display region being touched.

13. The lockset of claim 12, wherein the displayed code character comprises a displayed code number;
wherein the first adjusting manner comprises incrementing the displayed code number; and
wherein the second adjusting manner comprises decrementing the displayed code number.

14. The lockset of claim 13, wherein the first indicium comprises a first arrow pointing in a first direction; and
wherein the second indicium comprises a second arrow pointing in a second direction opposite the first direction.

15. The lockset of claim 9, wherein the touch-sensitive display region comprises a capacitive sensor array operable to sense a first swipe touch in a first direction and a second swipe touch in a second direction opposite the first direction; and wherein the credential reader is configured to adjust the displayed code character in the first adjusting manner in response to the first swipe touch and to adjust the displayed code character in a second adjusting manner opposite the first adjusting manner in response to the second swipe touch.

16. The lockset of claim 9, wherein the controller is further configured to determine a status of the lockset and to cause the touch-sensitive display to display indicia relating to the determined status.

17. The lockset of claim 9, wherein the credential reader has a sleep mode in which the touch-sensitive display is inactive and does not display the code character and an active mode in which the touch-sensitive display is active and displays the code character; and wherein the credential reader is configured to transition from the sleep mode to the active mode in response to the touch-sensitive display being touched.

18. The lockset of claim 9, wherein the touch-sensitive display comprises a film-printed light emitting diode (LED) array.

19. A lockset, comprising:
a locking member movable between a locking position and an unlocking position to adjust a locked state and an unlocked state of the lockset;
an electronic actuator configured to move the locking member of the lockset from the locking position to the unlocking position in response to receiving an unlock signal;
an outside assembly configured for mounting to an outer side of a door, wherein the outside assembly includes a credential reader comprising a touch-sensitive region operable to distinguish between swipes and taps, to transmit swipe information in response to a swipe on the touch-sensitive region, and to generate tap information in response to a tap on the touch-sensitive region; and
a controller in communication with the credential reader and the electronic actuator, wherein the controller is configured to:
generate credential information based upon the swipe information and the tap information;
compare the credential information to an authorized credential; and
transmit the unlock command to the electronic actuator in response to the credential information matching the authorized credential;
wherein the credential reader comprises a display including a first touch-sensitive display region configured to display a displayed code character, wherein the displayed code character is selected from a set of available code characters including a plurality of alphanumeric characters; and
wherein the controller is configured to adjust the displayed code character within the set of available code characters in response to the swipe information, and to include the displayed code character in the credential information in response to tapping of the displayed code character.

20. The lockset of claim 19, wherein the credential reader comprises a non-displaying track pad defining the touch-sensitive region.

21. The lockset of claim 19, wherein the first touch-sensitive display region comprises a light emitting diode (LED) array.

22. A lockset, comprising:
a locking member movable between a locking position and an unlocking position;
an electronic actuator configured to move the locking member from the locking position to the unlocking position in response to receiving an unlock signal;
a credential reader comprising:
a touch-sensitive display region configured to display a displayed code character and to transmit code character information in response to touching of the first touch-sensitive display region; and
a first touch-sensitive adjustment region configured to display a first adjustment indicium and to transmit a first adjustment signal in response to touching of the first touch-sensitive adjustment region; and
a controller in communication with the credential reader and the electronic actuator, wherein the controller is configured to:
adjust the displayed code character in a first adjusting manner in response to the first adjustment signal;
generate credential information based upon the code character information;
compare the credential information to an authorized credential; and
transmit the unlock signal to the electronic actuator in response to the credential information matching the authorized credential.

23. The lockset of claim 22, wherein the credential reader further comprises a second touch-sensitive adjustment region configured to display a second adjustment indicium and to transmit a second adjustment signal in response to touching of the second touch-sensitive adjustment region; and wherein the controller is further configured to adjust the displayed code character in a second adjusting manner in response to the second adjustment signal.

24. The lockset of claim 23, wherein the touch-sensitive display region is positioned between the first touch-sensitive adjustment region and the second touch-sensitive adjustment region;
wherein the first adjustment indicium comprises a first symbol, the first symbol pointing in a first direction;
wherein the second adjustment indicium comprises a second symbol, the second symbol pointing in a second direction opposite the first direction;
wherein to adjust the displayed code character in the first adjusting manner comprises to increment the displayed code character; and
wherein to adjust the displayed code character in the second adjusting manner comprises to decrement the displayed code character.

25. The lockset of claim 22, wherein the first touch-sensitive adjustment region comprises a second touch-sensitive display region configured to display the first adjustment indicium.

26. The lockset of claim 25, wherein the touch sensitive display region and the second touch-sensitive display region are separate and distinct from one another.

27. The lockset of claim 22, wherein the touch-sensitive display region and the first touch-sensitive adjustment region are separate and distinct from one another.

* * * * *